United States Patent
Yeon et al.

(10) Patent No.: US 8,817,502 B2
(45) Date of Patent: Aug. 26, 2014

(54) SWITCH CONTROL DEVICE, MULTI-CHANNEL CONVERTER INCLUDING THE SAME, AND SWITCH CONTROLLING METHOD

(75) Inventors: Jae-Eul Yeon, Seoul (KR); Won-Seok Kang, Chungbuk (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 771 days.

(21) Appl. No.: 13/047,019

(22) Filed: Mar. 14, 2011

(65) Prior Publication Data

US 2011/0234191 A1    Sep. 29, 2011

(30) Foreign Application Priority Data

Mar. 26, 2010   (KR) .................. 10-2010-0027403

(51) Int. Cl.
*H02M 3/158*    (2006.01)
(52) U.S. Cl.
USPC ........................................... 363/65; 323/271
(58) Field of Classification Search
USPC ............................... 363/65–71; 323/271, 272
See application file for complete search history.

(56) References Cited

U.S. PATENT DOCUMENTS

| | | | |
|---|---|---|---|
| 5,132,888 A | 7/1992 | Lo et al. | |
| 5,508,903 A | 4/1996 | Alexndrov | |
| 5,796,595 A | 8/1998 | Cross | |
| 6,404,175 B1 | 6/2002 | Yang et al. | |
| 6,628,106 B1 | 9/2003 | Batarseh et al. | |
| 6,995,548 B2* | 2/2006 | Walters et al. | 323/272 |
| 7,746,675 B2* | 6/2010 | Wang et al. | 363/44 |
| 2006/0187686 A1 | 8/2006 | Sun et al. | |
| 2008/0207237 A1* | 8/2008 | Ettes et al. | 455/500 |
| 2008/0238390 A1* | 10/2008 | Trivedi et al. | 323/283 |
| 2008/0266915 A1* | 10/2008 | Eckardt | 363/65 |
| 2009/0327786 A1* | 12/2009 | Carroll et al. | 713/340 |

OTHER PUBLICATIONS

Kang-Hyun Yi, et al. "A Novel Two Phase Interleaved LLC Series Resonant Converter using a Phase of the Resonant Capacitor", Jul. 2008, pp. 275-279, vol. 8, No. 3, Journal of Power Electronics, KAIST, Korea.

* cited by examiner

*Primary Examiner* — Jessica Han
(74) *Attorney, Agent, or Firm* — Okamoto & Benedicto LLP

(57) ABSTRACT

The present invention relates to a switch control device, a multi-channel converter including the same, and a switch control method thereof. A multi-channel converter includes at least two converters, and each converter includes at least one power switch. The multi-channel converter supplies the sum of the output power of at least two converters to the load. The switch control device generates at least two gate signals switching operation of each of at least one power switch of at least two converters. The switch control device modulates a switching frequency of at least one power switch according to the load, determines the number of phases of the multi-channel converter according to the load, and generates a gate signal for the phase difference corresponding to the number of the determined phases between at least two gate signals to be generated.

22 Claims, 9 Drawing Sheets

SWITCH CONTROL DEVICE, MULTI-CHANNEL CONVERTER INCLUDING THE SAME, AND SWITCH CONTROLLING METHOD

CROSS-REFERENCE TO RELATED APPLICATION

This application claims priority to and the benefit of Korean Patent Application No. 10-2010-0027403 filed in the Korean Intellectual Property Office on Mar. 26, 2010, the entire contents of which are incorporated herein by reference.

BACKGROUND OF THE INVENTION

1. Field of the Invention

The present invention relates to a switch control device, a multi-channel converter, and a switch control method, and particularly relates to a frequency modulation method. More particularly, the present invention relates to a switch control device using a multi-phase interleaving frequency modulation method, and a multi-channel converter and a switch control method thereof.

2. Description of the Related Art

In a case of an LLC resonant converter used as a power supply device of a display device such as PDP or LCD, it is not suitable for supplying a low voltage and a high current output power. In the LLC resonant converter, the high current load generates large current stress such that the output voltage may have a large ripple or the output capacitor may be heated. These problems reduce the life span of the converter.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention reduces stress caused by the high current output from the converter, improves the life span of the converter, and improves the efficiency of the converter.

A switch control device according to an exemplary embodiment of the present invention includes at least two converters having at least one power switch, and sums the output power of at least two converters to control a switching operation of a multi-channel converter supplied to a load. The switch control device includes a gate driver generating at least two gate signals for a switching operation of at least one power switch of two converters; and a multi-phase frequency modulation device modulating a switching frequency of at least one power switch according to the load, determining the number of phases of the multi-channel converter according to the load, and controlling the gate driver for a phase difference corresponding to the number of determined phases between at least two gate signals to be generated.

The multi-phase frequency modulation device includes a frequency modulator generating a reference clock signal to modulate the switching frequency according to the load; a count generator determining the number of phases of the multi-channel converter according to the load, determining a reference clock number to count the number of determined phases, and counting the reference clock signals as a unit of the reference clock number to generate a count signal; and a count comparator comparing the count signal with at least two reference signals corresponding to the number of at least two converters to generate at least two comparison signals for generating the at least two gate signals.

The count generator includes a phase management unit determining the reference clock number according to the load; and a MOD-n counter counting the reference clock signals to generate the count signal, wherein the phase management unit resets the MOD-n counter if the MOD-n counter counts the reference clock signals to the reference clock number.

The phase management unit includes an error amplifier amplifying a difference between a predetermined reference voltage and the detecting voltage corresponding to the current flowing in the load to generate an error voltage; an AD convertor digital-converting the error voltage to generate the load detection signal; and a phase comparator determining the reference clock number according to the load detection signal, and resetting the MOD-n counter if the count signal arrives at the reference clock number.

The counter generator includes a MOD-n counter reference counting the clock signals; and a phase management unit resetting the MOD-n counter after the MOD-n counter latches the count signal of the time counting the reference clock signal to a predetermined preset value.

The phase management unit includes a comparator comparing the count signal and the preset value to determine whether the count signal arrives at the preset value; a phase latch latching the count signal if the count signal arrives at the preset value, and generating a clear signal to reset the MOD-n counter; and a delay unit transmitting the MOD-n counter after delaying the clear signal during a predetermined time.

The count comparator includes at least two dividers dividing the latched count signal into the number of at least two converters, and multiplying the corresponding weight value among at least two weight values to generate the corresponding reference signal among two reference signals; and at least two comparators generating a comparison signal according to a comparison result of the corresponding reference signal and the count signal.

The gate driver generates at least two gate signals according to at least two comparison signals.

The frequency modulator includes an optocoupler through which the current corresponding to the output voltage of the multi-channel converter flows; a current mirror mirroring the current flowing in the optocoupler; a first dependant current source generating a first dependant current according to the mirrored current; a second dependant current source generating a second dependant current according to the mirrored current; a capacitor charged by the first dependant current and discharged by the second dependant current; a first comparator comparing the charged voltage to the capacitor and a predetermined first reference voltage; a second comparator comparing the charged voltage to the capacitor and a predetermined second reference voltage; and an SR flip-flop generating the edge of the reference clock signal according to the edge of the output signal of the first comparator, and generating the edge of the reference clock signal according to the edge of the output signal of the second comparator.

The counter generator includes a phase control unit generating at least two phase control signals determining the number of phases of the multi-channel converter according to the load, and generates at least one compensation count signal according to the reference clock signal;

The reference clock number is fixed according to the number of at least two converters, the at least one compensation count signal is a signal to control the operation of at least one converter among at least two converters when at least two converters all not operated; and The gate driver selects at least one of at least two comparison signals and at least one compensation count signal according to at least two phase control signals to generate at least one among at least two gate signals.

The phase control unit detects the output current flowing in the load to generate a detecting voltage, and generates at least two phase control signals according to the comparison result of the predetermined first reference voltage and the predetermined second reference voltage.

The count comparator includes at least two comparators generating at least two comparison signals according to the comparison result of the count signal and the corresponding reference signal; and a logic calculator inverting the output state in synchronization with one of the increasing and decreasing edges of the reference clock signal to generate a compensation clock signal, and inverting the output state in synchronization with one of the increasing and decreasing edges of the compensation clock signal generating at least one compensation count signal.

The gate driver includes at least three multiplexers selecting and outputting one of at least two comparison signals and at least one compensation count signal according to at least two phase control signals.

The multi-phase frequency modulation device includes a frequency modulator generating a reference clock signal to modulate the switching frequency according to the load; a phase control unit generating at least two phase control signals determining the number of phases of the multi-channel converter according to the load; and a count generator generating at least one compensation count signal according to the reference clock signal, and modulating the reference clock signal according to the number of at least two converters to generate at least two modulation clock signals, wherein at least one compensation count signal is a signal to control the operation of at least one converter among at least two converters when at least two converters are not operated, and the gate driver selects at least one of at least two modulation clock signals and at least one compensation count signal according to at least two phase control signals to generate at least one of at least two gate signals.

The count generator includes at least two D-flip-flops of the same number as the number of at least two resonant converters, and the gate driver includes at least two multiplexers of the same number as the number of at least two resonant converters. Each clock terminal of at least two D-flip-flops is input with the reference clock signal, one output terminal of at least two D flip-flops is connected to the input terminal of a neighboring D flip-flop, at least two D-flip-flops respectively generate the corresponding modulation clock signal, Each output terminal of at least two D flip-flops is connected to the input terminal of the corresponding multiplexer among at least two multiplexers. At least two multiplexers respectively output the modulation clock signal of the corresponding D flip-flop according to at least two phase control signals.

A switch control method according to the present invention is a method to control a switching operation of a multi-channel converter including at least two converters having at least one power switch, and supplying the sum of the output power of at least two converter to a load. The switch control method includes generating at least two gate signals for the switching operation of at least one power switch of at least two converters; modulating a switching frequency of at least one power switch according to the load; determining the number of phases of the multi-channel converter according to the load; and generating at least two gate signals to have a phase difference corresponding to the determined number of phases.

The modulating of the switching frequency includes generating the reference clock signal for the modulation of the switching frequency according to the load, and the switch control method further comprises: determining a reference clock number to count the determined number of phases, and counting the reference clock signals according to the reference clock number; and comparing the counting result with at least two reference signals corresponding to the entire number of at least two converters to generate at least two comparison signals.

The switch control method further includes resetting the counter result if the count result arrives at the reference clock number.

The modulation of the switching frequency further includes generating at least one compensation count signal according to the reference clock signal, the determining of the number of phases of the multi-channel converter includes generating at least two phase control signals to determine the number of phases of the multi-channel converter according to the magnitude of the load, and the generating of the gate signal includes selecting at least one of at least two comparison signals and at least one compensation count signal according to at least two phase control signals to generate at least one among at least two gate signals.

The generating of at least two phase control signals includes detecting the output current flowing in the load to generate a detecting voltage; generating one of at least two phase control signals according to the comparison result of a predetermined first reference voltage and the detecting voltage; and generating the other of at least two phase control signals according to the comparison result of a predetermined second reference voltage that is different from the first reference voltage and the detecting voltage.

A multi-channel converter according to the present invention includes at least two converters including at least one power switch; an output capacitor connected to each output terminal of at least two converters; and a switch control device controlling the switching operation of at least one power switch, wherein the switch control device modulates a switching frequency of at least one power switch according to the load, determines the number of converters to be operated among at least two converters according to the load, and generates the phase difference corresponding to the number of determined converters between at least two gate signals for the switching operation of each of at least one power switch of at least two converters.

The switch control device generates a reference clock signal of the load for the modulation of the switching frequency, determines a reference clock number to count the number of the determined converters, counts the reference clock signal as a unit of the reference clock number to generate the count signal, and compares the count signal and at least two reference signals corresponding to the number of at least two converters to generate at least two comparison signals to generate at least two gate signals.

The switch control device generates a reference clock signal to modulate the switching frequency according to the load, counts the reference clock signals as a unit of the reference clock number corresponding to at least two converters to generate the count signal, and generates at least one compensation count signal according to the reference clock signal, and at least one compensation count signal is a signal to control the operation of at least one converter of at least two converters when at least two converters are not operated.

As above described, the present invention provides a switch control device, a multi-channel converter including the same, and a switch control method.

Accordingly, the converter according to the present invention is effective to a device requiring low voltage and high current.

DETAILED DESCRIPTION OF THE EMBODIMENTS

Figure 1:
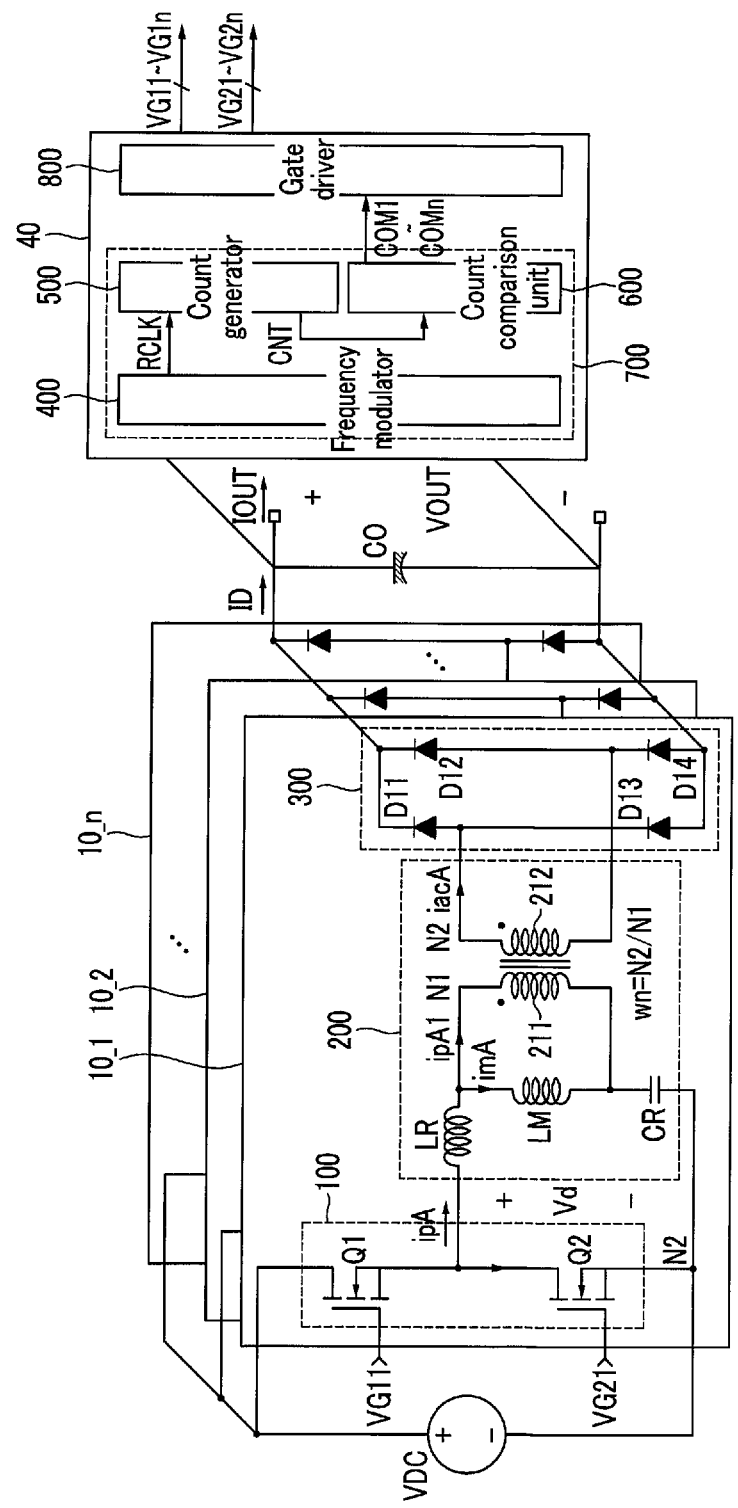
FIG. 1 is a view showing a switch control device including a multi-phase frequency modulation device according to an exemplary embodiment of the present invention and a multi-channel converter including the switch control device.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Exemplary embodiments of the present invention that can be realized by a person skilled in the art will now be described with reference to drawings.

FIG. 1 is a view showing a switch control device including a multi-phase frequency modulation device according to an exemplary embodiment of the present invention and a multi-channel converter including the switch control device.

As shown in FIG. 1, a multi-channel converter 1 includes n LLC resonant converters 10_1-10_n. The n LLC resonant converters, hereinafter called resonant converters 10_1-10_n, respectively correspond to one channel, and a multi-channel converter 1 according to an exemplary embodiment of the present invention is an n channel converter. The output powers of the n resonant converters are output powers having n phases that are not equal to each other. A phase difference p/n is between the neighboring output powers according to the generation sequence of the output power of the resonant converter.

The n resonant converters 10_1-10_n according to an exemplary embodiment of the present invention respectively receive the same DC input voltage VDC and generate rectification currents of the output power having the phase difference p/n (where n is the number of channels) to supply them to the load.

Firstly, a structure of the resonant converter 10_1 will be described. The configurations of the n resonant converters 10_1-10_n are the same such that only the resonant converter 10_1 will be described.

The multi-channel converter 1 includes a switch control device 40 controlling the switching operation of the n resonant converters 10_1-10_n. The switch control device 40 generates n upper gate signals VG11-VG1n and n lower gate signals VG21-VG2n controlling each switching operation of n upper switches and n lower switches that control the operation of the n resonant converters 10-1-10_n. The n upper gate signals have a phase difference of p/n, and the n lower gate signals respectively have a phase difference of p for the corresponding upper gate signals.

FIG. 1 shows one Q1 among the n upper switches and one Q2 of the n lower switches.

The resonant converter 10_1 includes a square wave generator 100, a resonant network unit 200, and a rectifier network unit 300.

The square wave generator 100 includes an upper switch Q1 and a lower switch Q2. The square wave generator 100 generates the input DC voltage VDC into a square wave by the switching operation of the upper switch Q1 and the lower switch Q2. In detail, the upper switch Q1 and the lower switch Q2 are alternately turned on/off. Thus, the driving voltage Vd between the node N1 and the node N2 becomes the square wave having the same level as the voltage VDC as the peak value and 0V as a minimum value. The upper switch Q1 is controlled by the gate signal VG11 transmitted from a switch control device 40, and the lower switch Q2 is controlled by the gate signal VG21. The upper switch Q1 and the lower switch Q2 according to an exemplary embodiment of the present invention are realized as a metal oxide semiconductor field-effect transistor (MOSFET), and are an n channel type. In an exemplary embodiment of the present invention, the upper switch Q1 and the lower switch Q2 are included, however the present invention is not limited thereto. That is, in a case that the output power may be generated by using one power switch, the present invention may also be applied.

The resonant network unit 200 includes a primary coil 211, a secondary coil 212, and a capacitor CR. FIG. 1 equivalently shows inductors LR and LM reflecting components of a leakage inductance and a magnetizing inductance of a transformer formed by the primary coil 211 and the secondary coil 212. In detail, the magnetizing inductor LM corresponds to the magnetizing inductance component, and the leakage inductor LR corresponds to the leakage inductance component. In the converter according to an exemplary embodiment of the present invention, the resonance is generated between the magnetizing inductor LM, the leakage inductor LR, and the capacitor CR. The driving current ipA input to the resonant network unit 200 has a sine wave by the resonance. The voltage of both terminals of the primary coil 211 is converted according to a winding rate wn of the primary coil 211 and the secondary coil 212, thereby the voltage is generated to the secondary coil 212. A driving current ip is converted according to a winding rate wn of the primary coil 211 and the secondary coil 212, and thereby an AC current iac is generated in the secondary coil 212. The waveform of the driving current ipA is the sum of the current ipA1 generated by the influence of the AC current iacA for the primary coil 211 and the magnetizing current imA generated by the magnetizing inductance.

The rectifier network unit 300 may be configured with a half-wave or full-wave rectification circuit. In an exemplary embodiment of the present invention, the rectifier network unit 300 is realized by a bridge rectifier circuit 310.

The bridge rectification circuit 310 includes four diodes D11-D14, and rectifies the AC current iacA to generate the rectification current Id1.

The sum of the rectification currents (not shown) of the n resonant converters 10-1-10_n becomes the rectification current ID.

The output capacitor C0 is charged by the rectification current ID, and if the load connected to the multi-channel converter 1 is larger than the rectification current ID, the output capacitor C0 is discharged and supplies the current to the load. Accordingly, the output current IOUT is determined according to the load. Both terminal voltages of the output capacitor C0 become the output voltage VOUT. Both terminals of the output capacitor C0 are connected to the switch control device 40. The switch control device 40 receives an increasing and decreasing load of the feedback circuit, thereby determining the switching frequency and the number of driving channels.

The switch control device 40 includes a multi-phase frequency modulation device 700 and a gate driver 800. The multi-phase frequency modulation device 700 determines the number of resonant converters and the number of driving channels to be operated among the n resonant converters. The multi-phase frequency modulation device 700 controls the gate driver 800 to generate the phase difference according to the number of driving channels between the upper gate signals of the resonant converters that are operated. Also, the multi-phase frequency modulation device 700 controls the gate driver 800 to generate the phase difference according to the number of driving channels between the lower gate signals of the resonant converters that are operated. The p phase difference is generated between the upper gate signal and the lower gate signal of the resonant converter.

The number of driving channels of the resonant converter to be operated among the n resonant converters according to the load means the number of the phases included in the output of the multi-channel converter 1. That is, the multi-channel converter 1 sums the output power having a plurality of phases to generate the necessary power. Hereafter, to determine the number of resonant converters to be operated among the n resonant converters according to the load is to determine the number of phases of the multi-channel converter 1.

The multi-phase frequency modulation device 700 includes a frequency modulator 400, a count generator 500, and a count comparison unit 600.

The frequency modulator 400 receives the output voltage VOUT, and modulates the switching frequency according to the increasing and decreasing of the load. That is, if the load is increased, the switching frequency is decreased to compensate the increase. In contrary, if the load is decreased, the switching frequency is increased. Through this operation, the output voltage VOUT is maintained as a uniform voltage. The frequency modulator 400 generates a reference clock signal RCLK determining the switching frequency, and outputs it to the count generator 500.

The count generator 500 operates the resonant converter of the number determined according to the load among the n resonant converters, and determines the phase difference between the gate signals transmitted to the n resonant converters. The count generator 500 determines the reference clock number RCC, and counts the reference clock signal RCLK as one period unit. The count generator 500 counts the reference clock signals RCLK until the reference clock number corresponds to the load. The count generator 500 transmits the count signal CNT according to the count result to the count comparison unit 600.

The count comparison unit 600 compares the count signal CNT and the n reference signals to generate n comparison signals. The gate driver 800 generates the n upper gate signals VG11-VG1n and the n lower gate signals VG21-VG2n according to the n comparison signals COM1-COMn.

The multi-phase frequency modulation device 700 according to an exemplary embodiment of the present invention increases the number of resonant converters that are operated among the n resonant converters as the load is increased. As the number of operated resonant converters is increased, the rectification current of each resonant converter is added, and thereby the rectification current ID is increased. Thus, the converter supplying the output power of the high current by using the plurality of resonant converters may be provided. The output terminals of the plurality of resonant converters are coupled in parallel, and the output voltage of the resonant converter is uniformly controlled. Accordingly, the output voltage is controlled as the level that is appropriate for the load.

Figure 2:
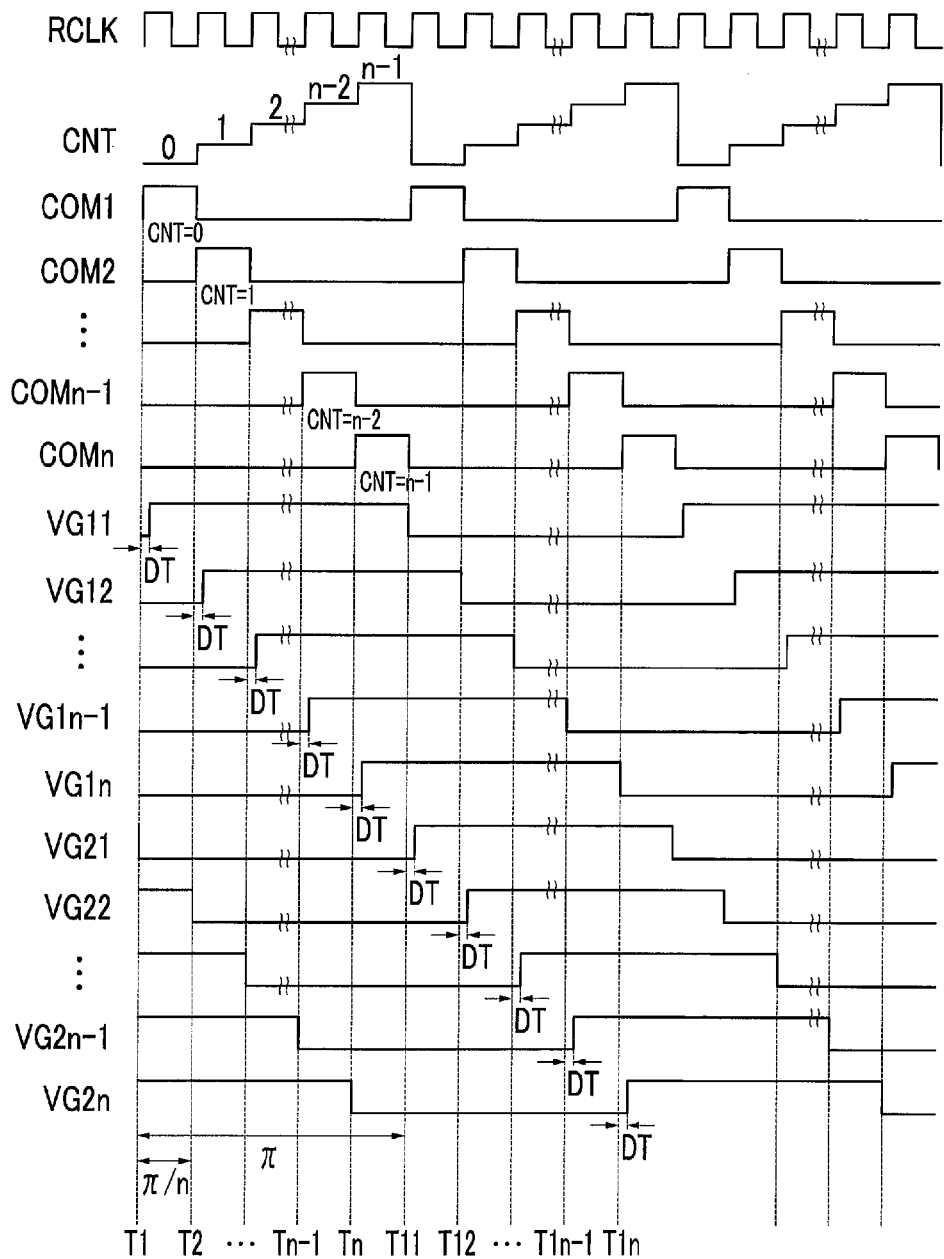
FIG. 2 is a view showing signals generated to control n resonant converters by using a multi-phase frequency modulation device 700 according to an exemplary embodiment of the present invention.

FIG. 2 is a view showing signals generated to control n resonant converters by using a multi-phase frequency modulation device 700 according to an exemplary embodiment of the present invention. In FIG. 2, it is assumed that the multi-phase frequency modulation device 700 is operated at the full load.

As shown in FIG. 2, the reference clock number RCC is counted as n, and the count generator 500 counts the reference clock signal RCLK as one period unit until the count result thereof becomes n. The maximum value of the reference clock number n is the entire number of resonant converters, and the count signal CNT generated by the count generator 500 according to the count result is increased from 0 to n−1. Also, the count signal CNT again repeats the increasing from 0 to n−1.

The count comparison unit 600 generates the comparison signal COM1 as the pulse signal generated in synchronization with a time T1 at which the count signal CNT becomes 0. The count comparison unit 600 generates the comparison signal COM2 as the pulse signal generated in synchronization with a time T2 at which the count signal CNT becomes 1. The count comparison unit 600 generates the comparison signal COM n−1 as the pulse signal generated in synchronization with a time Tn−1 at which the count signal CNT becomes n−2. The count comparison unit 600 generates the comparison signal COM n as the pulse signal generated in synchronization with a time Tn at which the count signal CNT becomes n−1. As described above, as the count signal CNT is increased, the comparison signals COM1-COMn as the sequential pulse signal are generated.

The gate driver 800 increases the upper gate signal VG11 and decreases the lower gate signal VG21 at the time delayed by a dead time DT from the time T1 that the comparison signal COM1 is generated. The gate driver 800 increases the upper gate signal VG12 and decreases the lower gate signal VG22 at the time delayed by the dead time DT from the time T2 that the comparison signal COM2 is generated. The gate driver 800 increases the upper gate signal VGn−1 and decreases the lower gate signal VG2n−1 at the time delayed by the dead time DT from the time Tn−1 that the comparison signal COMn−1 is generated. The gate driver 800 increases the upper gate signal VGn and decreases the lower gate signal VG2n at the time delayed by the dead time DT from the time Tn that the comparison signal COMn is generated. As described above, the gate driver 800 increases a plurality of upper gate signals and decreases a plurality of lower gate signals after the delay of the dead time DT in synchronization with the corresponding comparison signal.

If the reference clock signal RCLK is counted until n as the reference clock number RCC, the count is again repeated from the beginning to the reference clock number RCC. Accordingly, the comparison signals COM1-COMn are generated in synchronization with the time T11, the time T12, ..., the time T1n−1, and the time T1n through the same method.

The gate driver 800 increases the lower gate signal VG21 and decreases the upper gate signal VG11 at the time delayed by a dead time DT from the time T1 that the comparison signal COM1 is generated. The gate driver 800 increases the lower gate signal VG22 and decreases the upper gate signal VG12 at the time delayed by the dead time DT from the time T2 that the comparison signal COM2 is generated. The gate driver 800 increases the lower gate signal VG2n−1 and decreases the upper gate signal VGn−1 at the time delayed by the dead time DT from the time Tn−1 that the comparison signal COMn−1 is generated. The gate driver 800 increases the lower gate signal VG2n and decreases the upper gate signal VGn at the time delayed by the dead time DT from the time Tn that the comparison signal COMn is generated. As described above, the gate driver 800 increases a plurality of lower gate signals and decreases a plurality of upper gate signals after the delay of the dead time DT in synchronization with the corresponding comparison signal.

The operation of the above-described method is repeated. Here, the lower gate signal VG2i corresponds to the upper gate signal VG1i, where i as an arbitrary number among natural numbers from 1 to n has the phase difference of p. There are a phase difference of p/n between the neighboring upper gate signals, and a phase difference of p/n between the neighboring lower gate signals.

Figure 3:
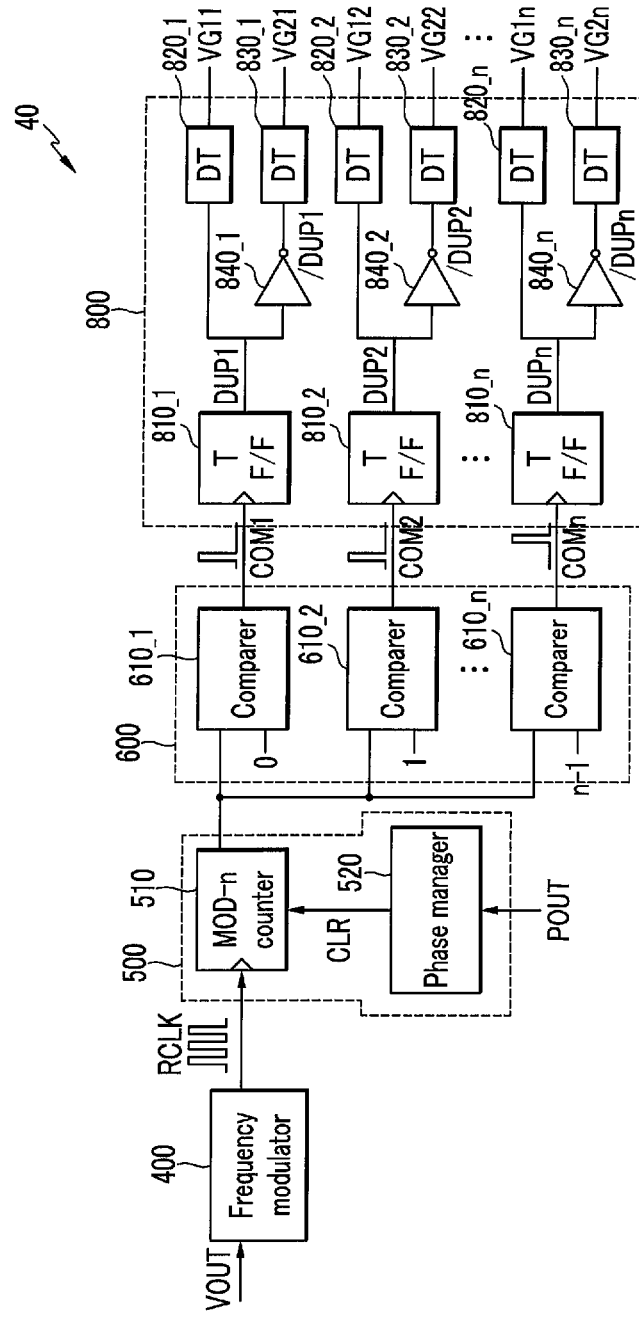
FIG. 3 is a view showing a switch control device 40 according to an exemplary embodiment of the present invention in detail.

FIG. 3 is a view showing a switch control device 40 according to an exemplary embodiment of the present invention in detail.

As shown in FIG. 3, the frequency modulator 400 receives the output voltage VOUT to generate the reference clock signal RCLK. The frequency modulator 400 generates the reference clock signal RCLK having the frequency that is changed according to the load by using the output voltage VOUT. The frequency of the reference clock signal RCLK is high in a no-load or a light-load state, and the frequency of the reference clock signal RCLK is low at a heavy-load or a full-load state.

The count generator 500 includes a MOD-n counter 510 and a phase management unit 520. The phase management unit 520 determines the reference clock number RCC according to the load. The phase management unit 520 may use the output power POUT to detect the load. Instead of the output power POUT, the output current IOUT supplied to the load may be used. The phase management unit 520 increases the reference clock number RCC as the load is increased. The phase management unit 520 resets the MOD-n counter 510, and thereby the count operation may be again started from the beginning. The reference clock number RCC is the signal controlling the reset of the MOD-n counter 510. The phase management unit 520 transmits a clear signal CLR to reset the MOD-n counter 510 to the MOD-n counter 510.

The MOD-n counter 510 resets the count signal CNT and again starts the count, if the count signal CNT representing the result counting the reference clock signal RCLK arrives at the reference clock number RCC. As the reference clock number RCC is high, the count period of the MOD-n counter 510 is increased and the maximum value of the count signal CNT is increased.

The count comparison unit 600 includes n comparators 610_1-610_n. The n comparators 610__1-610_n respectively compare the count signal CNT and the corresponding reference signal, and generate the comparison signal according to the comparison result. The n comparators 610_1-610_n according to an exemplary embodiment of the present invention may include a corresponding value among 0 to n−1 as the reference signal. For example, if the reference signal of the comparator 610_1 is 0, the comparator 610_1 generates the comparison signal COMP1 as the pulse signal at the time that the count signal CNT becomes 0.

The gate driver 800 includes n T-flip-flops 810_1-810_n, n upper delay units 820_1-820_n, n lower delay units 830_1-830_n, and n inverters 840_1-840_n.

The n T-flip-flops 810_1-810_n respectively invert the current output in synchronization with the pulse of the corresponding comparison signal to generate a duty pulse. For example, the T-flip-flop 810_1 inverts the current output in synchronization with the increasing edge of the comparison signal COM1 to generate the duty pulse DUP1 of the high level. Next, the T-flip-flop 810_1 inverts the current output in synchronization with the next increasing edge of the comparison signal COM1 to generate the duty pulse DUP1 of the low level. Thus, the duty pulse DUP1 has a duty cycle of 50%. The other duty pulses DUP2-DUPn are also generated through the same method, and the duty pulse DUP1 to the duty pulse DUPn sequentially have the phase difference of p/n.

The n upper delay units 820_1-820_n respectively generate the n upper gate signals VG11-VG1n according to the corresponding duty pulse. The n upper delay units 820_1-820_n respectively delay the upper gate signal by the dead time DT and output it when the corresponding upper switch is turned on according with the corresponding duty pulse. However, the n upper delay units 820_1-820_n respectively output the upper gate signal without the delay when the corresponding upper switch is turned off according to the corresponding duty pulse.

For example, when the upper delay unit 820_1 generates the upper gate signal VG11 to turn on the upper switch Q1 according to the increasing edge of the duty pulse DUP1, the upper gate signal VG11 is increased into the high level at the time delayed by the dead time DT from the increasing edge time of the duty pulse DUP1. In contrast, when the upper delay unit 820_1 generates the upper gate signal VG11 to turn off the upper switch Q1 according to the decreasing edge of the duty pulse DUP1, the upper gate signal VG11 is decreased into the low level at the decreasing edge time of the duty pulse DUP1.

The n inverters 840_1-840_n invert the corresponding duty pulse to generate an inverted duty pulse. The plurality of inverted duty pulses /DUP1-/DUPn are input to the corresponding lower delay unit.

The n lower delay units 830_1-830_n respectively generate the n lower gate signals VG21-VG2n according to the corresponding inverted duty pulse. The n lower delay units 830_1-830_n respectively delay the corresponding lower gate signal by the dead time DT and output it when the corresponding lower switch is turned on according to the inverted duty pulse. However, the n lower delay units 830_1-830_n respectively output the corresponding lower gate signal without delay when the corresponding lower switch is turned off according to the inverted duty pulse.

For example, when the lower delay unit 830_1 generates the lower gate signal VG21 to turn on the lower switch Q2 at the increasing edge of the inversion duty pulse /DUP1, the lower gate signal VG21 is increased into the high level at the time delayed by the dead time DT from the increasing edge time of the inversion duty pulse /DUP1. In contrast, when the lower delay unit 830_1 generates the lower gate signal VG21 to turn off the lower switch Q2 at the decreasing edge of the inversion duty pulse /DUP1, the lower gate signal VG21 is decreased into the low level at the decreasing edge time of the inversion duty pulse /DUP1.

Figure 4:
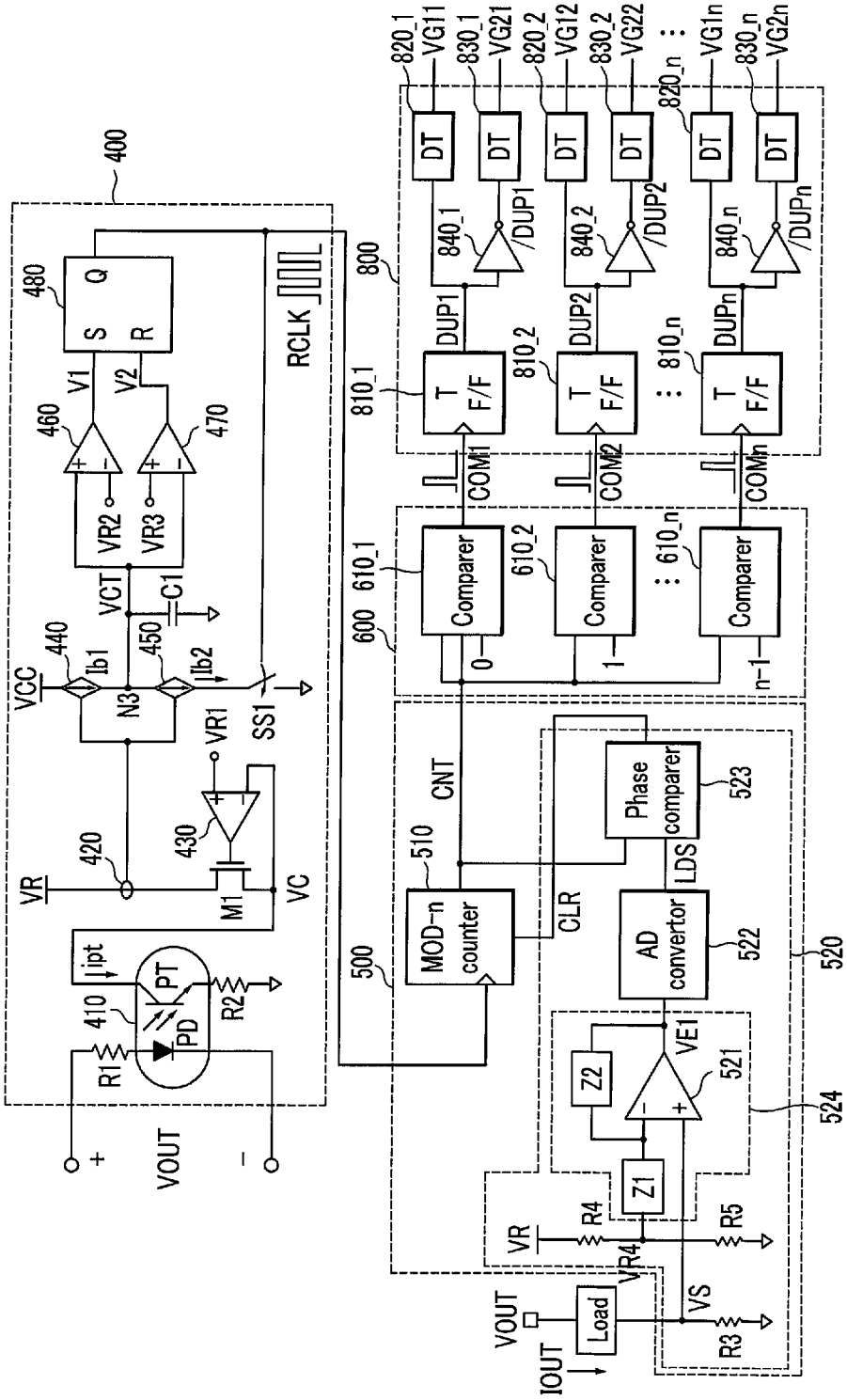
FIG. 4 is a view showing a count generator 500 and a frequency modulator 400 according to an exemplary embodiment of the present invention in detail.

FIG. 4 is a view showing a count generator 500 and a frequency modulator 400 according to an exemplary embodiment of the present invention in detail.

As shown in FIG. 4, the frequency modulator 400 includes an optocoupler 410, resistors R1 and R2, a current mirror 420, a first dependant current source 440, a second dependant current source 450, a first comparator 460, a second comparator 470, an SR flip-flop 480, a capacitor C1, a switch SS1, and a third comparator 430.

The optocoupler 410 includes an optodiode PD and an optotransistor PT. An anode of the optodiode PD is connected to one end of the resistor R1, and the optodiode PD is transmitted with the output voltage VOUT through the resistor R1. The current corresponding to the output voltage VOUT flows in the optodiode PD, and a photon corresponding to the flowing current is generated and transmitted to the optotransistor PT. The current ipt according to the intensity of the photon flows through the optotransistor PT.

An emitter of the optotransistor PT is connected to one end of the resistor R2, and the other end of the resistor R2 is grounded. If the current ipt flows in the optotransistor PT, the collector voltage of the optotransistor PT is increased. The collector voltage VC is transmitted to the inversion terminal (−) of the third comparator 430. The collector voltage VC as a voltage corresponding to the output voltage VOUT includes information for the load. That is, if the output voltage VOUT is increased and the collector voltage VC is increased, it means that the load is decreased. In contrast, if the output voltage VOUT is decreased the collector voltage VC is also decreased, and this means that the load is increased.

The third comparator 430 outputs the voltage signal according to the difference between the reference voltage VR1 input to the non-inversion terminal (+) and the collector voltage VC input to the inversion terminal (−). If the collector voltage VC is decreased into the level less than the reference voltage VR1, the voltage difference between the reference voltage 1 and the collector voltage VC is generated, and the output voltage of the third comparator 430 is increased. Thus, the impedance of the transistor M1 is decreased such that the current flowing through the transistor M1 is increased. The current flowing through the transistor M1 is increased, and the collector voltage VC is increased thereby being the same voltage as the reference voltage VR1. That is, the collector voltage VC is uniformly maintained as the reference voltage VR1.

The current mirror 420 mirrors the current ipt flowing in the optotransistor PT and transmits it to the first and second dependant current sources 440 and 450.

The first dependant current source 440 generates the first dependant current Ib1 according to the current ipt. The second dependant current source 450 generates the second dependant current Ib2 according to the current ipt. The first and second dependant current sources 440 and 450 generate the first and second dependant currents Ib1 and Ib2 that are changed according to the current ipt by using a current mirror circuit. The second dependant current Ib2 has a larger value than the first dependant current Ib1.

One end of the capacitor C1 is connected to a node N3 to which the first dependant current source 440 and the second dependant current source 450 are electrically connected, and the other end of the capacitor C1 is grounded. The switch SS1 is electrically connected between the second dependant current source 450 and the ground. The switch SS1 is operated according to the reference clock signal RCLK. In detail, the switch SS1 is turned on if the reference clock signal RCLK is the high level, and it is turned off if it is the low level.

The first dependant current Ib1 charges the capacitor C1 during the time that the switch SS1 is turned off, and thereby the voltage VCT is increased. The second dependant current Ib2 discharges the capacitor C1 during the time that the switch SS1 is turned on, and thereby the voltage VCT is decreased. The voltage VCT is input to the non-inversion terminal (+) of the first comparator 460 and the inversion terminal (−) of the second comparator 470.

The first comparator 460 compares the reference voltage VR2 and the voltage VCT, and if the voltage VCT is more than the reference voltage VR2, the signal U1 of the high level is output, while if the voltage VCT is less than the reference voltage VR2, the signal U1 of the low level is output.

The second comparator 470 compares the reference voltage VR3 and the voltage VCT, and if the voltage VCT is less the reference voltage VR3, the signal U2 of the high level is output, while if the voltage VCT is more than the reference voltage VR3, the signal U2 of the low level is output. Here, the reference voltage VR2 according to an exemplary embodiment of the present invention is higher than the reference voltage VR3.

The SR flip-flop 480 receives the signal U1 and the signal U2 at the set terminal S and the reset terminal R, and generates the reference clock signal RCLK according to the level of the signal U1 and the signal U2. Hereafter, the SR flip-flop 480 generates the reference clock signal RCLK that becomes the high level in synchronization with the increasing edge of the signal U1 input to the set terminal S, and becomes the low level in synchronization with the increasing edger of the signal U2 input to the reset terminal R.

If the voltage VCT is increased to the reference voltage VR2, the increasing edge of the signal U1 is generated, and the SR flip-flop 480 increases the reference clock signal RCLK. The reference clock signal RCLK becomes the high level and the switch SS1 is turned on, and thereby the capacitor C1 is discharged. Thus, the voltage VCT is decreased.

If the decreased voltage VCT is decreased to the reference voltage VR3, the signal U2 becomes the high level, and thereby the SR flip-flop 480 decreases the reference clock signal RCLK. If the reference clock signal RCLK becomes the low level and the switch SS1 is turned off, the capacitor C1 is charged by the current Ib1 of the first dependant current source 440 and the voltage VCT is increased. This operation is repeated.

If the output voltage VOUT is increased such that the current ipt is increased, the current of the first dependant current source 440 and the second dependant current source 450 is increased. Thus, the magnitude of the current charging or discharging the capacitor C1 is increased such that the frequency of the reference clock signal RCLK is increased. In contrast, if the output voltage VOUT is decreased such that the current ipt is decreased, the current of the first dependant current source 440 and the second dependant current source 450 is decreased. Thus, the magnitude of the current charging or discharging the capacitor C1 is decreased such that the frequency of the reference clock signal RCLK is decreased.

That is, if the load is decreased, the frequency of the reference clock signal RCLK is increased, and if the load is increased, the frequency of the reference clock signal RCLK is decreased.

The phase management unit 520 includes resistors R3, R4, and R5, impedance elements Z1 and Z2, an OP amp 521, an AD convertor 522, and a phase comparator 523.

The resistor R3 is connected to one terminal of the load such that a detecting voltage VS is generated according to the output current IOUT flowing in the load.

The OP amp 521 includes an inversion terminal (−) that is connected to one terminal of the impedance element Z1 and one terminal of the impedance element Z2, a non-inversion terminal (+) that is input with the detecting voltage VS, and an output terminal that is connected to the other terminal of the impedance element Z2. The OP amp 521 forms an error amplifier 524 along with the impedance element Z1 and the impedance element Z2. The reference voltage VR is resistor-divided according to the resistor ratio of the resistor R4 and the resistor R5. The error amplifier 524 amplifies the difference between the detecting voltage VS and the resistor-divided voltage VR4, thereby generating the error voltage VE.

The error voltage VE is increased as the load is increased such that the detecting voltage VS is increased, and it is decreased as the load is decreased such that the detecting voltage VS is decreased. However, the present invention is not limited thereto. That is, in an exemplary embodiment of the present invention, the output of the error amplifier 524 is the non-inversion amplification, but when the output of the error amplifier 524 is the inversion amplification, the error voltage VE is opposite according to the increasing and decreasing of the load.

The AD convertor 522 digital-converts the error voltage VE to generate load detection signal LDS and to transmit it to the phase comparator 523. When the load detection signal LDS is a 2 bit digital signal, the reference clock number RCC may control until it becomes 4. Accordingly, four upper gate signals and four lower gate signals that are capable of controlling four resonant converters may be generated. Also, the load detection signal LDS is 3 bit digital signal, the reference clock number RCC may control until it becomes 8. Accordingly, eight upper gate signals and eight lower gate signals that are capable of controlling eight resonant converters may be generated. That is, although the number of resonant converters is increased, the bit number of the load detection signal is small.

The phase comparator 523 resets the MOD-n counter 510 according to the load detection signal LDS. In detail, the phase comparator 523 determines the reference clock number RCC according to the load detection signal LDS, and if the count signal CNT arrives at the reference clock number RCC, it generates the clear signal CLR and transmits it to the MOD-n counter 510.

The phase comparator 523 determines the reference clock number RCC according to the load detection signal LDS under consideration of the number n of the resonant converter. For example, in the case of the converter 1 realized with three resonant converters, the reference clock number RCC is not over three. Accordingly, the reference clock number RCC according to the load detection signal LDS is one of 0, 1, and 2. If the load is very low such that the reference clock number RCC is determined as 0, the count signal CNT is reset whenever the reference clock is counted one time. Accordingly, only one of three resonant converters is operated. If the reference clock number RCC is determined to be 1, the count signal CNT is reset whenever the reference clock is counted two times. Accordingly, only two of three resonant converters are operated. Finally, if the load is large such that the reference clock number RCC is determined to be 2, the count signal CNT is reset whenever the reference clock is counted three times. Accordingly, all three resonant converters are operated.

The MOD-n counter 510 resets the count signal CNT if the clear signal CLR is input, and the reference clock signal RCLK is again counted.

The description of the count comparison unit 600 and the gate driver 800 is the same as that of FIG. 3 such that it is omitted.

Figure 5:
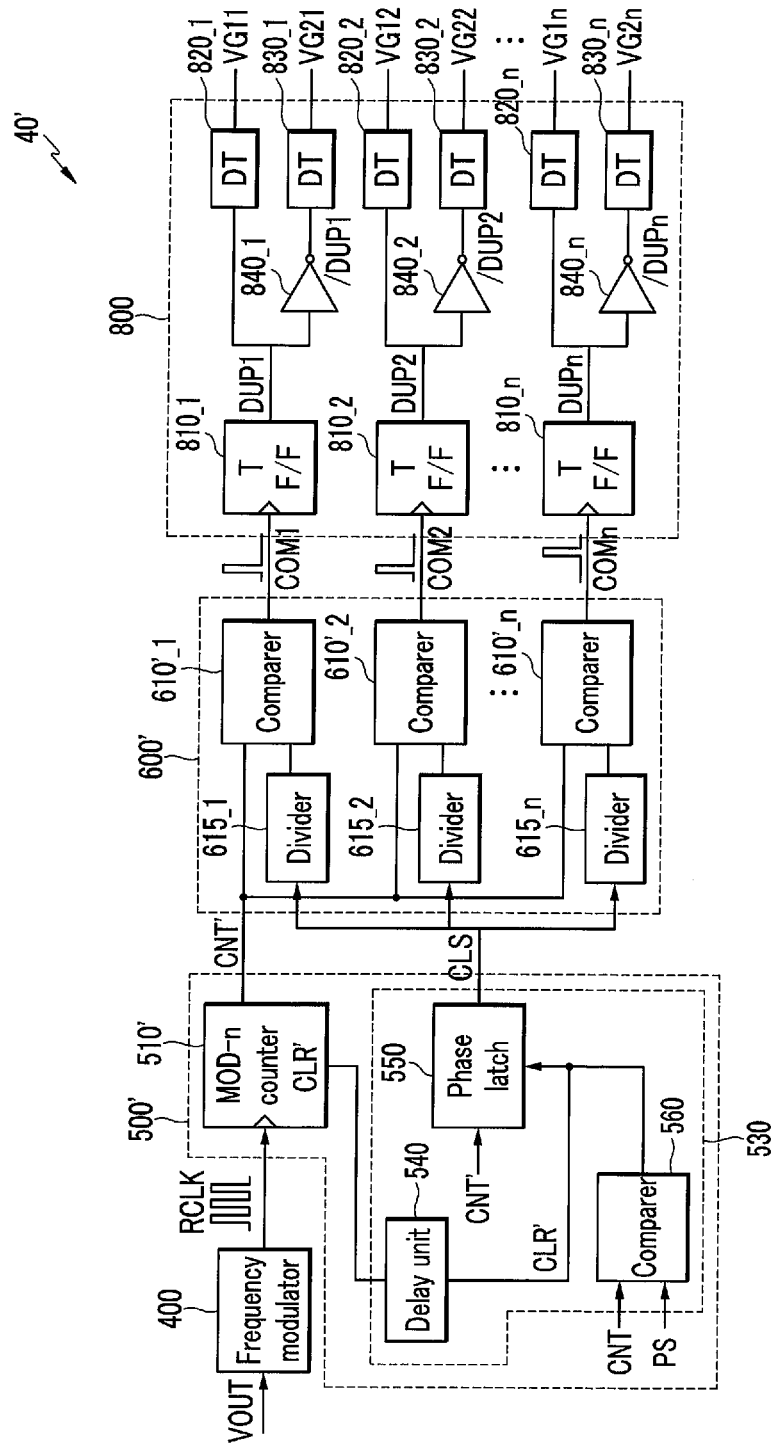
FIG. 5 is a view showing a switch control device 40' including a count generator 500' and a count comparison unit 600' according to another exemplary embodiment of the present invention.

FIG. 5 shows a switch control device 40' including a count generator 500' and a count comparison unit 600' according to another exemplary embodiment of the present invention.

Compared with the previous exemplary embodiment, a MOD-n counter 510' transmits the counter latch signal CLS to the count comparison unit 600' by using a preset value according to the load. The count comparison unit 600' converts the counter latch signal CLS into values corresponding to the comparators 610'_1-610'_n to use as the corresponding reference signals.

The count generator 500' includes the MOD-n counter 510' and a phase management unit 530. The MOD-n counter 510' is the same as the previous MOD-n counter 510 such that the description thereof is omitted. The preset value PS may be previously determined as a predetermined value. The phase management unit 530 includes a delay unit 540, a count latch 550, and a comparator 560. In the previous exemplary embodiment, to determine the reference clock number RCC uses the load detection signal LDS, but in another exemplary embodiment of the present invention, the reference clock number RCC is fixed as the preset value PS. That is, the comparator 560 compares the count signal CNT' and the preset value PS, and generates the output signal according to the comparison result. In detail, the comparator 560 transmits the count finish signal CFS to the phase latch 550 if the count signal CNT' arrives at the preset value PS.

The phase latch 550 latches the count signal CNT' of the time that the count finish signal CFS is transmitted to generate the count latch signal CLS, and transmits the clear signal CLR' to reset the MOD-n counter 510'.

The delay unit 540 transmits the clear signal CLR' to the MOD-n counter 510' after a predetermined time that the clear signal CLR' is transmitted.

Compared with the previous exemplary embodiment, the count comparison unit 600' further includes a plurality of dividers 615_1-615_n providing the reference signal corresponding to each of comparators 610'_1-610'_n.

The plurality of dividers 615_1-615_n respectively divide the count latch signal CLS of the digital signal into n, and multiples the corresponding weight value. The corresponding weight value is determined according to the sequence of the resonant converter that is operated according to the increasing of the load. For example, the comparison signal COM1' of the comparator 610'_1 is the signal to generate gate signals VG11 and VG21 of the resonant converter 10_1 that is always operated. The weight value of the divider 615_1 corresponding to the comparator 610'1_1 is 0. The gate signals VG12 and VG22 to operate the resonant converter 10_2 must be generated as the load is increased. The weight value of the divider 615_2 corresponding to the comparator 610'1_2 generating the comparison signal COM2' to generate the gate signals VG12 and VG22 is 1. The weight value is determined by this method.

Another exemplary embodiment of the present invention will be described with reference to FIG. 6 to FIG. 9. For ease of description, it is assumed that n is 3.

A count generator 500" operates resonant converters of the necessary number of three resonant converters 10_1, 10_2, and 10_3, and determines the phase difference between three upper gate signals VG11, VG12, and VG13 and three lower gate signals VG21, VG22, and VG23 transmitted to three resonant converters according to the necessary number. A count comparison unit 600" compares the count signal CNT" and three reference signals to generate five comparison signals COM1", COM2", COM3", COM4" and COM11, and COM12. A gate driver 800" generates three upper gate signals VG11, VG12, and VG13 and three lower gate signals VG21, VG22, and VG23 according to five comparison signals COM1"-COM3" and COM11-COM12.

Figure 6:
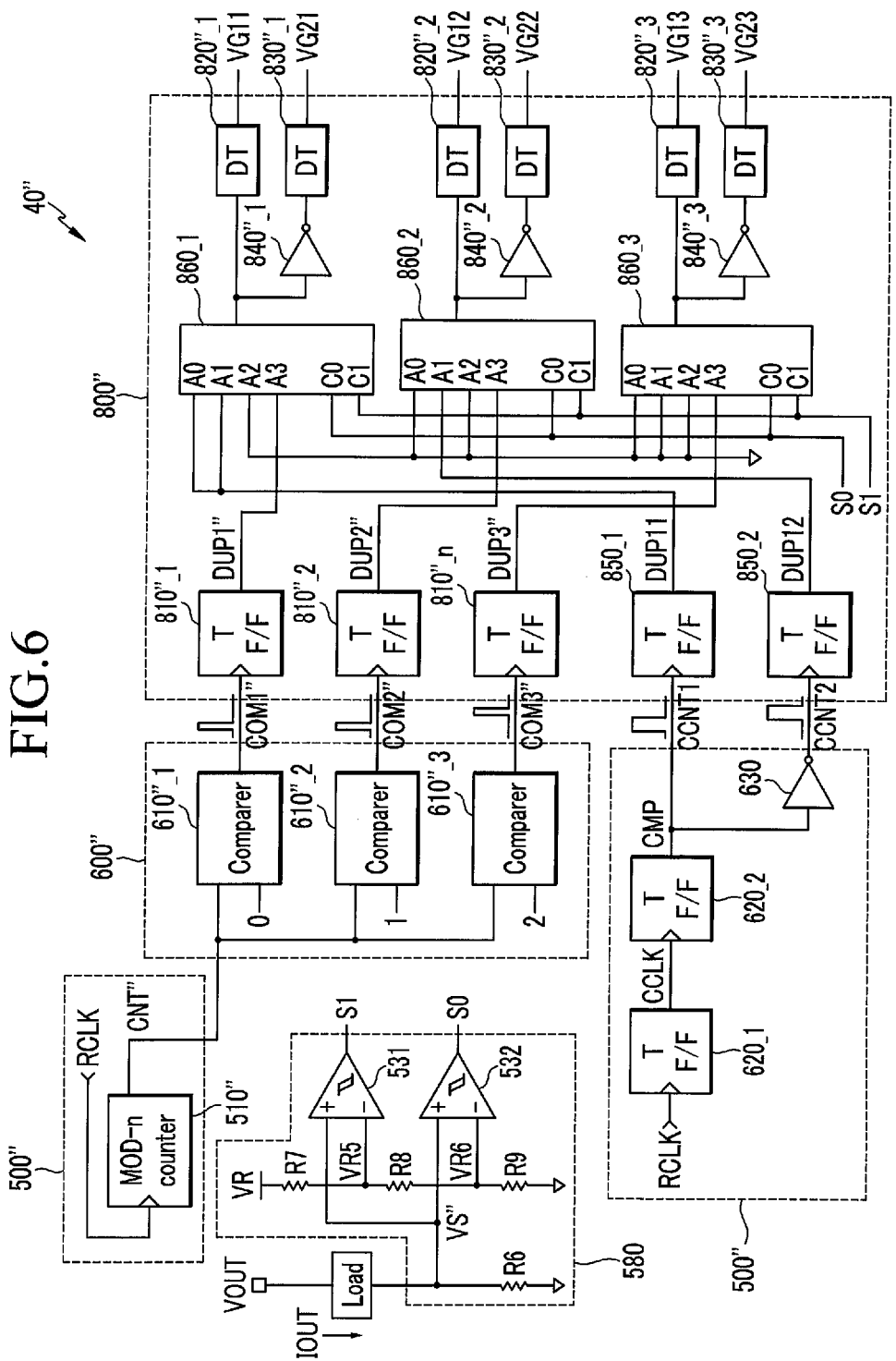
FIG. 6 is a view showing a portion of a switch control device 40" according to another exemplary embodiment of the present invention.

Firstly, FIG. 6 is a view showing a portion of a switch control device 40" according to another exemplary embodiment of the present invention.

The switch control device 40" includes the count generator 500", a phase control unit 580, the count comparison unit 600", and the gate driver 800". The frequency modulator 400 is the same as that of the previous exemplary embodiment. As stated, the switch control device 40" according to another exemplary embodiment of the present invention further includes the phase control unit 580. The multi-channel converter 1 includes three resonant converters such that the reference clock number RCC may not be over three.

The count generator 500" does not include the phase management units 520 and 530, and includes an inverter 630, and two T-flip-flops 620_1 and 620_2, differently from the previous exemplary embodiment. The gate driver 800" further includes two T-flip-flops 850_1 and 850_2, and three multiplexers 860_1, 860_2, and 860_3.

The MOD-n counter 510" counts the reference clock signals RCLK to generate the count signal CNT", and resets the count signal CNT" every fixed reference clock number RCC, that is, three times (0, 1, and 2).

The T-flip-flop 620_1 generates the compensation clock signal CCLK according to the reference clock signal RCLK. The T-flip-flop 620_2 generates the compensation count signal CCNT1 according to the compensation clock signal CCLK. The inverter 630 inverts the compensation count signal CCNT1 to generate the compensation count signal CCNT2. The compensation count signal CCNT1 and the compensation count signal CCNT2 are signals having the inverted phase.

As described above, in another exemplary embodiment of the present invention, the reference clock number RCC is fixed. In another exemplary embodiment of the present invention, the reference clock number RCC is fixed as three such that the count signal CNT" is suitable to control for each rectification current of three resonant converters to have the p/3 phase difference.

In the case that two resonant converters operate according to the load among three resonant converters 10_1, 10_2, and 10_3, the operation of two resonant converters may not be controlled by using the count signal CNT". That is, when only two resonant converters are operated, the count signal CNT" having a p/2 phase difference is needed between the rectification currents of the converters.

Also, when only one or two resonant converters are operated, the switching operation of the resonant converter must be controlled according to the clock signal having the frequency that is lower than the reference clock signal RCLK. The reference clock signal RCLK has an appropriate frequency in the case that all three resonant converters 10_1-10_3 are operated.

Accordingly, when one or two resonant converters are operated, the compensation clock signal CCLK having the frequency that is lower than the reference clock signal RCLK is used to supply the appropriate output current IOUT to the load.

In this way, the switch control device 40" according to another exemplary embodiment of the present invention may generate the rectification current having an appropriate phase difference according to the load and supply the appropriate output current IOUT according to the load by using the compensation clock signal CCLK, the compensation count signal CCNT1, and the compensation count signal CCNT2, even though the reference clock number RCC is fixed.

Three converters may not all be operated, and when one or two are operated under a light load, the entire system efficiency of the multi-channel converter may be increased. The phase control unit 580 detects the output current IOUT flowing in the load to generate phase control signals S0 and S1 representing the information for the load. The phase control signals S0 and S1 represent the number of converters that will be operated among three resonant converters 10_1-10_3. The phase control unit 580 includes a resistor R6 generating the detecting voltage VS" according to the output current IOUT, three resistors R7, R8, and R9 dividing the reference voltage VR to generate a reference voltage VR5 and a reference voltage VR6, and two hysteresis comparators 531 and 532.

The hysteresis comparator 531 compares the reference voltage VR5 and the detecting voltage VS" according to the hysteresis characteristic to generate the phase control signal S1. The hysteresis comparator 531 includes the non-inversion terminal (+) input with the detecting voltage VS" and the inversion terminal (−) input with the reference voltage VR5. Accordingly, the hysteresis comparator 531 compares the reference voltage VR5 and the detecting voltage VS" according to the hysteresis characteristic to generate the phase control signal S1.

The hysteresis comparator 532 compares the reference voltage VR6 and the detecting voltage VS" according to the hysteresis characteristic to generate the phase control signal S0. The hysteresis comparator 532 includes the non-inversion terminal (+) input with the detecting voltage VS" and the inversion terminal (−) input with the reference voltage VR6. Accordingly, the hysteresis comparator 532 compares the reference voltage VR6 and the detecting voltage VS" according to the hysteresis characteristic to generate the phase control signal S0.

As the reference voltage VR5 is larger than the reference voltage VR6, and as the load is increased, the detecting voltage VS" is increased. Accordingly, if the detecting voltage VS" is less than the reference voltage VR6 under the non-load or light load state, the phase control signals S0 and S1 are the low level. When the load is increased such that the detecting voltage VS" is larger than the reference voltage VR6 and less than the reference voltage VR5, the phase control signal S0 is the high level and the phase control signal S1 is the low level. If the detecting voltage VS" is larger than the reference voltage VR5 under the middle-load or full-load state, the phase control signal S0 and the phase control signal S1 are all high level.

The count comparison unit 600" includes three comparators 610"_1, 610"_2, and 610"_3.

The three comparators 610"_1, 610"_2, and 610"_3 respectively generate the comparison signals COMP1"-COMP3" according to the result of comparing the count signal CNT" and one of the corresponding reference signals 0, 1, and 2.

The T-flip-flop 810"_1 generates the duty pulse DUP1" according to the comparison signal COM1". The T-flip-flop 810"_2 generates the duty pulse DUP2" according to the comparison signal COM2". The T-flip-flop 810"_3 generates the duty pulse DUP3" according to the comparison signal COM3".

The T-flip-flop 850_1 generates the duty pulse DUP11 according to the compensation count signal CCNT1. The T-flip-flop 850_2 generates the duty pulse DUP12 according to the compensation count signal CCNT2.

The three multiplexers 860_1-860_3 respectively include four input terminals A0-A3, and two control input terminals C0 and C1 respectively receiving the phase control signals S0 and S1. The three multiplexers 860_1-860_3 respectively select one of the input signals respectively input to four input terminals according to the phase control signals S0 and S1 respectively input to the two control input terminals C0 and C1. For ease of description, when the phase control signals S0 and S1 are the low level, a logic value is 0, and when they are the high level, the logic value is 1.

The three multiplexers 860_1-860_3 respectively select the signal input to the input terminal A0 and output it when the phase control signals S0 and S1 are 0 and 0. The three multiplexers 860_1-860_3 respectively select the signal input to the input terminal A1 and output it when the phase control signals S0 and S1 are 1 and 0. The three multiplexers 860_1-860_3 respectively select the signal input to the input terminal A3 and output it when the phase control signals S0 and S1 are 0 and 1. The three multiplexers 860_1-860_3 respectively select the signal input to the input terminal A4 and output it when the phase control signals S0 and S1 are 1 and 1. Referring to FIG. 5, the phase control signals S0 and S1 may be generated as one of 0 and 0, 1 and 0, and 1 and 1, however 0 and 1 may not be generated. However, the present invention is not limited to the structure of FIG. 5, such that it will be described together.

The multiplexer 860_1 includes input terminals A0 and A1 input with the duty pulse DUP11, an input terminal A2 that is grounded, and an input terminal A3 input with the duty pulse DUP1".

The multiplexer 860_2 includes an input terminal A1 input with the duty pulse DUP12, input terminals A0 and A2 that are grounded, and an input terminal A3 input with the duty pulse DUP2".

The multiplexer 860_3 includes input terminals A0-A2 that are grounded and an input terminal A3 input with the duty pulse DUP3".

An operation of the count generator 500", the count comparison unit 600", and the gate driver 800" according to another exemplary embodiment of the present invention will be described with reference to FIG. 7.

Figure 7:
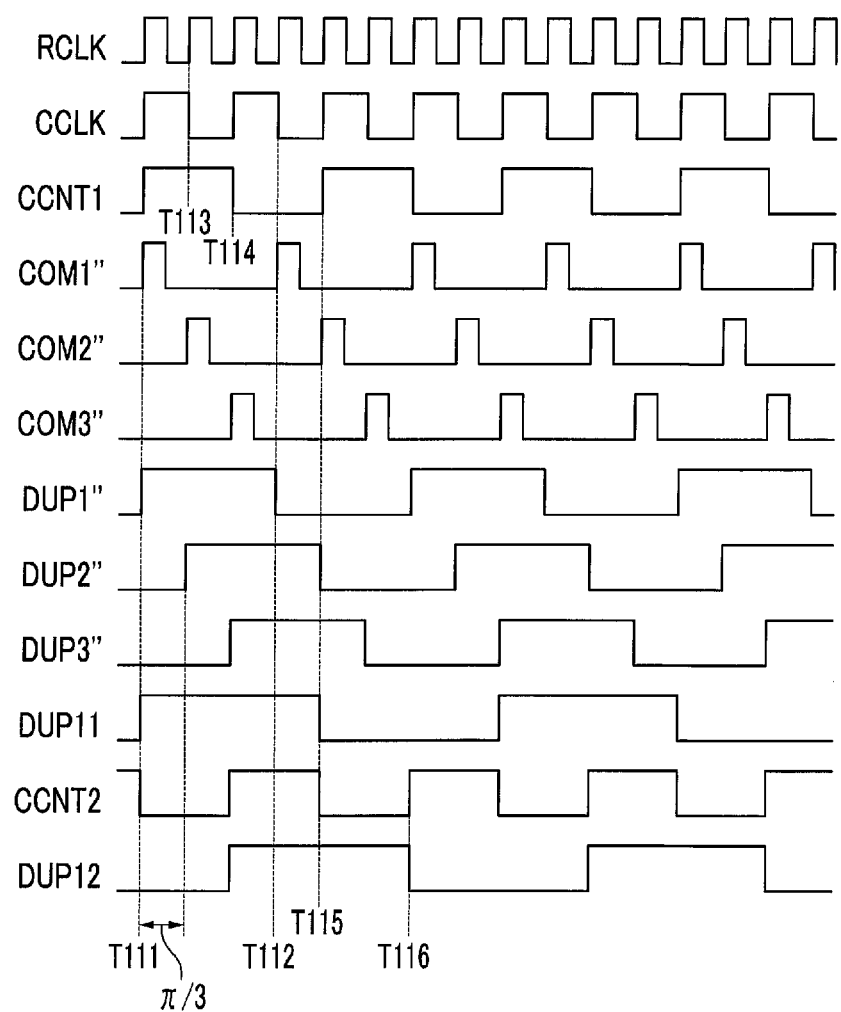
FIG. 7 is a view showing an operation of a count generator 500"', a count comparison unit 600", and a gate driver 800" according to another exemplary embodiment of the present invention.

FIG. 7 is a waveform diagram of signals according to another exemplary embodiment of the present invention.

As shown in FIG. 7, a compensation clock signal CCLK is ½ of the reference clock signal RCLK frequency, and a compensation count signal CCNT1 is ¼ of the reference clock signal RCLK frequency. In all exemplary embodiments of the present invention, the T-flip-flops invert the current output at the increasing edge of the input signal and then generates the output signal. However, the present invention may use another logic gate inverting the current output at the decreasing edge of the input signal to generate the output signal.

The T-flip-flop 810"_1 generates the increasing duty pulse DUP1" in synchronization with the increasing edge of the comparison signal COM1" at the time T111. The T-flip-flop 810"_1 generates the decreasing duty pulse DUP1" in synchronization with the increasing edge of the comparison signal COM1" at the time T112. The T-flip-flop 810"_1 repeats the same operation according to the comparison signal COM1".

Through the same method, the T-flip-flop 810"_2 and the T-flip-flop 810"_3 generate the duty pulse DUP2" and the duty pulse DUP3" having the p/3 phase difference.

The T-flip-flop 620_1 generates the increasing compensation clock signal CCLK in synchronization with the increasing edge of the reference clock signal RCLK at the time T111. The T-flip-flop 620_1 generates the decreasing compensation clock signal CCLK in synchronization with the increasing edge of the reference clock signal RCLK at the time T113. The T-flip-flop 620_1 repeats this according to the reference clock signal RCLK to generate the compensation clock signal CCLK shown in FIG. 6.

The T-flip-flop 620_2 generates an increasing comparison signal CMP11 in synchronization with the increasing edge of the compensation clock signal CCLK at the time T111. The T-flip-flop 620_2 generates a decreasing comparison signal CMP11 in synchronization with the increasing edge of the compensation clock signal CCLK time T114. The T-flip-flop 620_2 repeats this according to the compensation clock signal CCLK to generate the comparison signal CMP11 shown in FIG. 7.

The inverter 630 inverts the compensation count signal CCNT1 to generate the compensation count signal CCNT2.

The T-flip-flop 850_1 generates the increasing duty pulse DUP11 in synchronization with the increasing edge of the compensation count signal CCNT1 at the time T111. The T-flip-flop 850_1 generates the decreasing duty pulse DUP11 in synchronization with the increasing edge of the compensation count signal CCNT1 at the time T115. The T-flip-flop 850_1 repeats this operation according to the compensation count signal CCNT1.

The T-flip-flop 850_2 generates the increasing duty pulse DUP12 in synchronization with the increasing edge of the compensation count signal CCNT2 at the time T114. The T-flip-flop 850_2 generates the decreasing duty pulse DUP12 in synchronization with the increasing edge of the compensation count signal CCNT2 at the time T116. The T-flip-flop 850_2 repeats this operation according to the compensation count signal CCNT2.

When the phase control signal S0 and S1 are 0 and 0, the multiplexer 860_1 outputs the duty pulse DUP11. Here, the multiplexer 860_2 and the multiplexer 860_3 all output the ground voltage. Accordingly, one resonant converter of three resonant converters 10_1-10_3 switching-operates the power switch according to the duty pulse DUP11.

When the phase control signal S0 and S1 are 1 and 0, the multiplexer 860_1 outputs the duty pulse DUP11. Here, the multiplexer 860_2 outputs the duty pulse DUP12. The multiplexer 860_3 outputs the ground voltage. Accordingly, two resonant converters among three resonant converters 10_1-10_3 switching-operate the power switch according to the duty pulse DUP11 and the duty pulse DUP12. The duty pulse DUP11 and the duty pulse DUP12 have the p/2 phase difference to each other such that the rectification currents respectively output from two resonant converters have the p/2 phase difference.

When the phase control signals S0 and S1 are 0 and 1, the multiplexers 860_1 to 860_3 all output the ground voltage. As described above, this case is not generated.

When the phase control signals S0 and S1 are 1 and 1, the multiplexers 860_1-860_3 respectively output the corresponding duty pulses DUP1"-DUP3".

In this way, when the reference clock number RCC is fixed, an additional signal to control the switching operation of the resonant converter must be generated according to the operation number of the resonant converters.

As described above, a plurality of resonant converters of the multi-channel converter 1 are operated to generate a plurality of rectification currents according to the increase of the load, and the generated plurality of rectification currents respectively have the predetermined phase difference. The sum of the generated currents generates the large rectification current.

Figure 8:
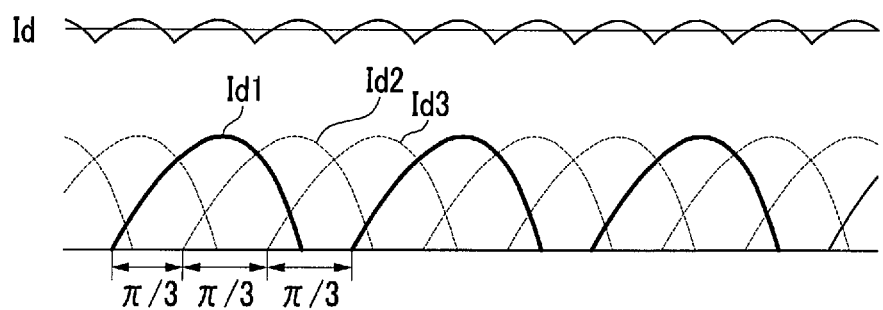
FIG. 8 is a view showing rectification currents Id1, Id2, and Id3 that are generated according to another exemplary embodiment of the present invention and a rectification current Id that is their sum.

FIG. 8 is a view showing rectification currents Id1, Id2, and Id3 that are generated according to another exemplary embodiment of the present invention and a rectification current Id that is their sum.

As shown in FIG. 8, the rectification currents Id1, Id2, and Id3 of three resonant converters are the 3 phase currents having the p/3 phase difference. The rectification current Id of the sum of the rectification currents Id1, Id2, and Id3 as a very high current compared with the rectification current Id1, Id2, and Id3 is suitable for the high current load.

A switch control device 40''' according to another exemplary embodiment of the present invention does not include the comparator 600'' and the three T-flip-flops 810''_1-810''_3, differently from the previous exemplary embodiment.

Figure 9:
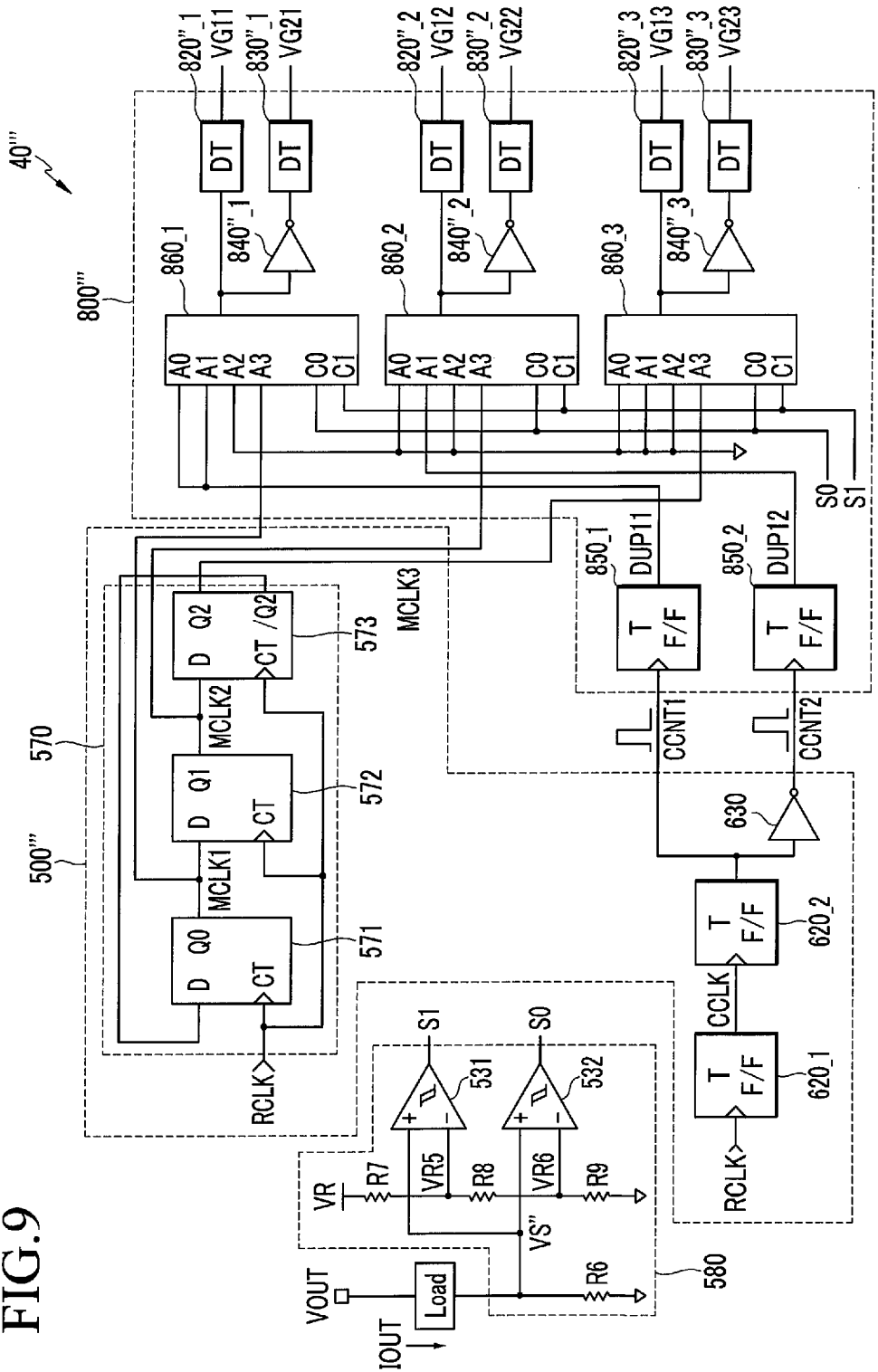
FIG. 9 is a view showing a control device 40''' according to another exemplary embodiment of the present invention.

FIG. 9 is a view showing the switch control device 40''' according to another exemplary embodiment of the present invention.

The switch control device 40''' includes a Johnson counter 570 instead of the counter 510''. The Johnson counter 570 modulates the reference clock signal into the frequency according to the number of resonant converters to generate a plurality of modulation clock signals. The number of the plurality of modulation clock signals is the number of the plurality of resonant converters. The plurality of modulation clock signals respectively have the p/n phase difference between the neighboring clock signals.

The phase control unit 580 is the same as that of the previous exemplary embodiment such that like reference numerals are used, and the description thereof is omitted. The configuration of the gate driver 800'' is the same as that of the gate driver 800'' according to the previous exemplary embodiment except for the T-flip-flops 810''_1-810''_3 such that the reference numerals of FIG. 6 are used, and the detailed description thereof is omitted.

The Johnson counter 570 according to another exemplary embodiment of the present invention includes three D flip-flops 571, 572, and 573 to control three resonant converters. The number of D flip-flops included in the Johnson counter 570 is determined according to the number of resonant converters.

The reference clock signal RCLK is input to each clock terminal of the three D flip-flops 571, 572, and 573. Each of the output terminals Q0, Q1, and Q2 of the three D flip-flops 571, 572, and 573 is connected to the input terminal A3 of the corresponding multiplexer of three multiplexers 860_1-860_3. The input terminal D of the D flip-flop 571 is connected to the inversion output terminal /Q2 of the D flip-flop 573, the input terminal D of the D flip-flop 572 is connected to the output terminal Q0 of the D flip-flop 571, and the input terminal D of the D flip-flop 573 is connected to the output terminal Q1 of the D flip-flop 572.

The D flip-flop 571-573 outputs the input signal input to the input terminal in synchronization with the increasing edge of the reference clock signal RCLK input to the clock terminal CT.

The modulation clock signal MCLK1 of the D flip-flop 571 is the same as the duty pulse DUP1", the modulation clock signal MCLK2 of the D flip-flop 572 is the same as the duty pulse DUP2", and the modulation clock signal MCLK3 of the D flip-flop 573 is the same as the duty pulse DUP3".

The operation of the Johnson counter 570 will be described with reference to FIG. 8.

The reference clock signal RCLK is increased at the time T111, and here, the input terminal D of the D flip-flop 571 is input with the signal of which the modulation clock signal MCLK3 of the D flip-flop 573 is inverted (the signal of which the level of the DUP3" is inverted in FIG. 8) such that the D flip-flop 571 increases the modulation clock signal MCLK1 into the high level.

The reference clock signal RCLK is increased at the time T113, and here, the input terminal D of the D flip-flop 572 is input with the modulation clock signal MCLK1 of the D flip-flop 571 (the DUP1" in FIG. 8) such that the D flip-flop 572 increases the modulation clock signal MCLK2 into the high level.

The reference clock signal RCLK is increased at the time T114, and here, the input terminal D of the D flip-flop 573 is input with the modulation clock signal MCLK2 of the D flip-flop 572 (the DUP2" is input in FIG. 8) such that the D flip-flop 573 increases the modulation clock signal MCLK3 into the high level. Thus, the signal of which the modulation clock signal MCLK3 is inverted is input to the input terminal D of the D flip-flop 571 as the low level, and the D flip-flop 571 decreases the modulation clock signal MCLK1 in synchronization with the increasing edge of the reference clock signal RCLK generated at the time T112.

The operations of the other configurations are the same as those of the previous exemplary embodiment such that the detail description is omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description Of Symbols> multi-channel converter 1, resonant converter 10_1-10_n upper gate signal VG11-VG1n, lower gate signal VG21-VG2n square wave generator 100, resonant network unit 200, rectifier network unit 300, upper switch Q1 lower switch Q2, primary coil 211, secondary coil 212, capacitor CR magnetizing inductor LM, leakage inductor LR, bridge rectification circuit 310 diode D11-D14, switch control device 40, 40', 40", 40''' multi-phase frequency modulation device 700, gate driver 800, 800''', 500''' frequency modulator 400, count generator 500, 500', 500'', 500''' count comparison unit 600, 600', 600'', Johnson counter 570

What is claimed is:

1. A switch control device controlling a switching operation of a multi-channel converter including at least two converters and supplying a sum of output powers of the at least two converters to a load, the control device comprising:
   a gate driver generating at least two gate signals for a switching operation of at least one power switch in each of the at least two converters according to at least two comparison signals; and
   a multi-phase frequency modulation device modulating a switching frequency of the at least one power switch according to the load, determining a number of phases of the multi-channel converter according to the load, and controlling the gate driver to generate the at least two gate signals that have a phase difference corresponding to the determined number of phases,
   wherein the multi-phase frequency modulation device generates a count signal and compares the count signal with at least two reference signals corresponding to a number of the at least two converters to generate the at least two comparison signals.

2. The switch control device of claim 1, wherein the multi-phase frequency modulation device includes:
   a frequency modulator generating a reference clock signal to modulate the switching frequency according to the load;
   a count generator determining the number of phases of the multi-channel converter according to the load, determining a reference clock number to count the determined number of phases, and counting the reference clock signal as a unit of the reference clock number to generate the count signal; and
   a count comparator comparing the count signal with the at least two reference signals corresponding to the number of the at least two converters to generate the at least two comparison signals for generating the at least two gate signals.

3. The switch control device of claim 2, wherein the count generator includes:
   a phase management unit determining the reference clock number according to the load; and
   a MOD-n counter counting the reference clock signal to generate the count signal,
   wherein the phase management unit resets the MOD-n counter if the MOD-n counter counts the reference clock signal to the reference clock number.

4. The switch control device of claim 3, wherein the phase management unit includes:
   an error amplifier amplifying a difference between a predetermined reference voltage and a detecting voltage corresponding to a current flowing to the load to generate an error voltage;
   an AD convertor digital-converting the error voltage to generate a load detection signal; and
   a phase comparator determining the reference clock number according to the load detection signal, and resetting the MOD-n counter if the count signal arrives at the reference clock number.

5. The switch control device of claim 2, wherein the count generator includes:
   a MOD-n counter counting the reference clock signal; and
   a phase management unit resetting the MOD-n counter after the MOD-n counter latches the count signal of a time counting the reference clock signal to a predetermined preset value.

6. The switch control device of claim 5, wherein the phase management unit includes:
   a count comparator comparing the count signal and the preset value to determine whether the count signal arrives at the preset value;
   a phase latch latching the count signal if the count signal arrives at the preset value, and generating a clear signal to reset the MOD-n counter; and
   a delay unit transmitting a latched count signal of the MOD-n counter after delaying the clear signal during a predetermined time.

7. The switch control device of claim 6, wherein the count comparator includes:
   at least two dividers dividing the latched count signal into the number of at least two converters, and multiplying a corresponding weight value among at least two weight values to generate a corresponding reference signal among two reference signals; and
   at least two comparators generating a comparison signal according to a comparison result of the corresponding reference signal and the count signal.

8. The switch control device of claim 2, wherein the frequency modulator includes:
   an optocoupler through which a current corresponding to an output voltage of the multi-channel converter flows;
   a current mirror mirroring the current flowing through the optocoupler to generate a mirrored current;
   a first dependant current source generating a first dependant current according to the mirrored current;
   a second dependant current source generating a second dependant current according to the mirrored current;
   a capacitor charged by the first dependant current and discharged by the second dependant current to generate a charged voltage;
   a first comparator comparing the charged voltage and a predetermined first reference voltage;
   a second comparator comparing the charged voltage and a predetermined second reference voltage; and
   an SR flip-flop generating an edge of the reference clock signal according to an edge of an output signal of the first comparator, and generating an edge of the reference clock signal according to an edge of an output signal of the second comparator.

9. The switch control device of claim 2, wherein:
   the count generator includes a phase control unit generating at least two phase control signals determining the number of phases of the multi-channel converter according to the load, and generates at least one compensation count signal according to the reference clock signal;
   the reference clock number is fixed according to the number of the at least two converters, the at least one compensation count signal is a signal to control the operation of at least one converter among the at least two converters when the at least two converters are not all operated; and
   the gate driver selects at least one of the at least two comparison signals and the at least one compensation count signal according to at least two phase control signals to generate at least one among the at least two gate signals.

10. The switch control device of claim 9, wherein the phase control unit detects an output current flowing to the load to generate a detecting voltage, and generates the at least two phase control signals according to a result of comparing a predetermined first reference voltage and a predetermined second reference voltage.

11. The switch control device of claim 9, wherein the count comparator includes:
at least two comparators generating the at least two comparison signals according to a result of comparing the count signal and a corresponding reference signal; and
a logic calculator inverting an output state in synchronization with one of increasing and decreasing edges of the reference clock signal to generate a compensation clock signal, and inverting the output state in synchronization with one of increasing and decreasing edges of the compensation clock signal generating at least one compensation count signal.

12. The switch control device of claim 9, wherein:
the gate driver includes at least three multiplexers selecting and outputting one of the at least two comparison signals and at least one compensation count signal according to at least two phase control signals.

13. The switch control device of claim 1, wherein the multi-phase frequency modulation device includes:
a frequency modulator generating a reference clock signal to modulate the switching frequency according to the load;
a phase control unit generating at least two phase control signals determining the number of phases of the multi-channel converter according to the load; and
a count generator generating at least one compensation count signal according to the reference clock signal, and modulating the reference clock signal according to the number of at least two converters to generate at least two modulation clock signals,
wherein at least one compensation count signal is a signal to control the operation of at least one converter among the at least two converters when the at least two converters are not operated, and
the gate driver selects at least one of at least two modulation clock signals and at least one compensation count signal according to at least two phase control signals to generate at least one of the at least two gate signals.

14. The switch control device of claim 13, wherein the count generator includes at least two D-flip-flops of a same number as the number of the at least two converters,
the gate driver includes at least two multiplexers of the same number as the number of the at least two converters,
each clock terminal of the at least two D-flip-flops is input with the reference clock signal, one output terminal of the at least two D flip-flops is connected to the input terminal of a neighboring D flip-flop, the at least two D-flip-flops respectively generate a corresponding modulation clock signal,
each output terminal of the at least two D flip-flops is connected to the input terminal of a corresponding multiplexer among at least two multiplexers, and
the at least two multiplexers respectively output the modulation clock signal of a corresponding D flip-flop according to at least two phase control signals.

15. A switch control method to control a switching operation of a multi-channel converter including at least two converters and supplying the sum of the output power of the at least two converters to a load, comprising:
generating at least two gate signals for a switching operation of at least one power switch in each of the at least two converters;
modulating a switching frequency of the at least one power switch according to the load;
determining a number of phases of the multi-channel converter according to the load;
counting a reference clock signal to generate a counting result;
comparing the counting result with at least two reference signals corresponding to the number of the at least two converters to generate at least two comparison signals; and
generating at least two gate signals to have a phase difference corresponding to the determined number of phases according to the at least two comparison signals.

16. The switch control method of claim 15, wherein the modulating of the switching frequency includes generating the reference clock signal for the modulation of the switching frequency according to the load, and
the switch control method further comprises: determining a reference clock number to count the determined number of phases, and counting the reference clock signal according to the reference clock number to generate the counting result; and
comparing the counting result with the at least two reference signals corresponding to the entire number of the at least two converters to generate the at least two comparison signals.

17. The switch control method of claim 16, further comprising resetting the counter result if the count result arrives at the reference clock number.

18. The switch control of claim 16, wherein the modulation of the switching frequency further includes generating at least one compensation count signal according to the reference clock signal,
the determining of the number of phases of the multi-channel converter includes generating at least two phase control signals to determine the number of phases of the multi-channel converter according to the magnitude of the load,
the reference clock number is fixed according to the number of the at least two converters,
the at least one compensation count signal is a signal to control the operation of at least one converter among the at least two converters when the at least two converters are not all operated, and
the generating of the gate signal includes selecting at least one of the at least two comparison signals and at least one compensation count signal according to the at least two phase control signals to generate at least one among the at least two gate signals.

19. The switch control method of claim 18, wherein the generating of the at least two phase control signals includes:
detecting an output current flowing to the load to generate a detecting voltage;
generating one of the at least two phase control signals according to a comparison result of a predetermined first reference voltage and the detecting voltage; and
generating the other of the at least two phase control signals according to the comparison result of a predetermined second reference voltage that is different from the first reference voltage and the detecting voltage.

20. A multi-channel converter comprising:
at least two converters including at least one power switch;
an output capacitor connected to each output terminal of the at least two converters; and a switch control device controlling a switching operation of at least one power switch in each of at least two converters, wherein the switch control device modulates a switching frequency of the at least one power switch according to a load, determines a number of converters to be operated among the at least two converters according to the load, generates a count signal, compares the count signal to at least two reference signals corresponding to the number of converters to be operated to generate at least two comparison signals, and generates a phase difference corresponding to the number of the converters to be operated between at least two gate signals for the switching operation of the at least one power switch according to the at least two comparison signals.

21. The multi-channel converter of claim 20, wherein the switch control device generates a reference clock signal of the load for the modulation of the switching frequency, determines a reference clock number to count the number of the converters to be operated, counts the reference clock signal as a unit of the reference clock number to generate the count signal, and compares the count signal to the at least two reference signals corresponding to the number of the at least two converters to generate at least two comparison signals to generate the at least two gate signals.

22. The multi-channel converter of claim 20, wherein the switch control device generates a reference clock signal to modulate the switching frequency according to the load, counts the reference clock signal as a unit of a reference clock number corresponding to the at least two converters to generate the count signal, generates at least one compensation count signal according to the reference clock signal, and the at least one compensation count signal is a signal to control the operation of at least one converter of the at least two converters when the at least two converters are not all operated.

* * * * *